(12) United States Patent  
Bardin

(10) Patent No.: US 6,550,648 B2
(45) Date of Patent: Apr. 22, 2003

(54) METERING DEVICE AND DISPENSER COMPRISING SUCH A DEVICE

(75) Inventor: Ennio Bardin, Orbe (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/902,521

(22) Filed: Jul. 10, 2001

(65) Prior Publication Data

US 2002/0014497 A1 Feb. 7, 2002

(30) Foreign Application Priority Data

Jul. 28, 2000 (EP) .............................. 00202686

(51) Int. Cl.[7] .................................................. B67D 5/56
(52) U.S. Cl. ..................................... 222/129.3; 141/351
(58) Field of Search ............................. 222/63, 129.3, 222/167, 325, 328, 129.1, 142, 145, 413; 141/351, 352, 363, 364, 365, 366; 604/72

(56) References Cited

U.S. PATENT DOCUMENTS 5,312,020 A * 5/1994 Frei ........................... 222/142

5,495,962 A    3/1996 Nomura ........................ 222/80
5,503,628 A *  4/1996 Fetters et al. .................. 604/72
5,774,773 A *  6/1998 Otsuka et al. ............... 222/325
6,289,948 B1 * 9/2001 Jeannin et al. .............. 141/351

FOREIGN PATENT DOCUMENTS

DE    195 19 682 A    12/1996
GB    2 257 129 A      1/1993

* cited by examiner

Primary Examiner—Ehud Gartenberg
Assistant Examiner—Thach H Bui
(74) Attorney, Agent, or Firm—Winston & Strawn

(57) ABSTRACT

A device for metering a powder-based food product including a hopper for storage of the powder, and a metering device located in the hopper in order to convey the powder from the hopper to a feed zone. The feed zone includes a basic portion having an opening for allowing a metered quantity of powder to fall. A sealing element is arranged with the basic portion in order to allow sealing of the opening of the basic portion. The device also includes an operating mechanism for moving the sealing element into a sealing position when the metering device is not operating.

19 Claims, 8 Drawing Sheets

METERING DEVICE AND DISPENSER COMPRISING SUCH A DEVICE

BACKGROUND

The invention relates to the field of equipment for automatic drink dispensing on request. More specifically, the invention relates to devices intended for use in catering facilities of airplanes, trains, other means of transport, offices or other installations where space for such dispensers is limited.

Currently, there is no drink dispenser that uses soluble powders for the preparation of drinks, such as those based on coffee or the like, in service on airlines. In general, the systems for preparation of coffee for such applications all employ the principle of extraction of ground roast coffee. The time necessary for the extraction renders the principle impractical and inflexible for the preparation of combinations or mixtures such as coffee with milk, cappuccino or the like. Since manual preparation is necessary, such systems cannot be installed in a satisfactory manner as self-service systems for passengers.

On the other hand, drink dispensers using powder-based products do exist in public places. These dispensers are in general devices of fairly large capacity. Such devices comprise containers for powder storage, hoppers downstream of the containers equipped with metering devices, and mixing bowls downstream of the hoppers for receiving the powder, mixing it with a quantity of water and then effecting the dispensing by gravity through dispensing tubes.

In these known drink dispensers, the powder is ejected from the metering device into the mixing bowl by means of a metering screw through an opening zone of the hopper. The metered quantity depends on the number of revolutions of the metering screw. When this principle is applied to dispensers of small dimensions, problems of consistency in the quantity of powder metered and problems of fouling of the mixing bowl and the powder delivery ducts are observed. These problems are due, it seems, to the fact that a little powder always remains at the edge of the opening zone after the metering means has been stopped. At least some of this powder tends to fall into the bowl between preparation cycles, which fouls the bowl, forming poorly soluble pieces or lumps. Some of the powder also tends to agglomerate in the region of the opening of the metering device, forming burr-like encrustations which are made moist and sticky by the steam originating from the mixing bowl. These problems are exacerbated when very hygroscopic powders such as milk powder are used. Regular cleaning of the device is thus essential in order to avoid contamination.

Another problem encountered stems from the production of steam in the downstream part of the dispenser, in particular in the mixing bowl where the water is mixed with the metered quantity of powder. This steam tends to find its way back into the metering device and to moisten the powder located in the hopper and in the storage part. The result is a deterioration in the quantity and the fluidity of the powder, the latter of which can lead to blockage.

Accordingly, there is a need to solve these problems by providing a metering device which can be used in a drink dispensing device, in particular, although not exclusively, for application to a compact dispenser intended for fitting out airliners or other means of transport, and also possibly for offices, cafeterias or restaurants. The present invention satisfies this need.

There is also a need to propose a practical and clean way of refilling powder in a compact dispenser in which the manual operation is maintained as low as possible and in which the refilling operation is accurate and does not mess up the dispensing area.

SUMMARY OF THE INVENTION

The present invention relates to a device for metering a powder-based food product comprising a hopper for storage of a food or beverage powder, a feed zone that includes a basic portion having an opening for allowing a metered quantity of powder to fall, a metering device located in the hopper for conveying powder from the hopper to the feed device, a sealing element arranged with the basic portion to provide sealing of the opening of the basic portion, and an operating mechanism for positioning the sealing element in a sealing position when the metering device is not operating.

The sealing element is movable between the sealing position, where the powder cannot fall into the feed zone, and an inoperative position, where powder can fall freely into the feed zone, and wherein the operating mechanism is operatively associated with the sealing element to move the sealing element between the sealing and inoperative positions. Such a device therefore makes it possible to solve the problems associated with the powder falling into the mixing bowl outside the drink preparation cycle and thus makes it possible to avoid the problems due to fouling of the mixing bowl(s) and of fouling or blocking of the dispensing tube(s).

The basic portion comprises a tube that has an opening for allowing powder to fall into the feed zone, and the sealing element is arranged coaxially in relation to the basic portion in order to allow sealing of the basic portion tube opening by rotation of the sealing element around the basic portion. The sealing element is in the form of a tube having open and closed portions, wherein, in the inoperative position, the opening of the sealing element is located adjacent the opening of the basic portion so that powder can fall into the feed zone. Such an arrangement has the advantage of eliminating, by the scraping action of the sealing element, the burr-like powder encrustations that can agglomerate on the edges of the opening. The opening therefore remains perfectly clean after each metering cycle.

According to a preferred aspect, the sealing element itself is also a portion of tube having a slot, with the sealing element being displaceable by sliding in rotation around the basic portion between an open position, in which the slot of the sealing element is at least in part coincident with the opening, and a closed position, in which the slot of the sealing element is displaced completely beyond the area of the opening. In this way, the agglomeration of powder on the edges of the opening is avoided. Furthermore, the sealing element, which seals the opening completely, serves as a steam screen, preventing the powder located in the hopper from absorbing the moisture coming from the steam in the bowl.

The operating mechanism of the sealing element comprises at least one drive means such as an electric motor. Given the fact that the invention relates more specifically to a device intended to fit into a confined space, it is advantageous if the movement of the sealing element is brought about by a drive means located at the rear of the hopper by means of a transmission system. This system includes at least one transmission rod and at least one gear mechanism connected to the rod and the sealing element. The advantages of providing the operating means at the rear of the hopper include the possibility of rendering at least a part of the metering device easily removable and capable of being plugged into the operating means, while keeping the latter permanently connected to the electric circuit of the machine.

The device according to the invention furthermore comprises a control system. The control system carries out a metering cycle that comprises the steps of (a) actuation of the operating mechanism to move the sealing element from the sealing position to the inoperative position to an open position and deactuation of the operating mechanism when the sealing element is in the inoperative position, (b) actuation of the metering device to start powder metering, (c) deactuation of the metering device to stop powder metering, and (d) reactuation of the operating means to move the sealing element from the inoperative position to the sealing position and deactuation of the operating mechanism when the sealing element is in the sealing position.

The steps (a) to (d) may be carried out in this order or in a different order. In an embodiment, the steps (a) and (b) may be performed simultaneously or (b) be performed slightly before step (a). In another embodiment, the steps (c) and (d) may be also preformed simultaneously or step (d) slightly before step (c).

The invention also relates to a dispensing device allowing the preparation of drinks according to a choice of combinations from at least two sources of powder and having the special feature of being capable of fitting in a compact space such as in the cupboard of an airliner catering compartment or the like. To this end, the drink device according to the invention comprises at least two hoppers for the storage of two different food or beverage-forming powders which can be selected either individually or as a mixture, with each hopper of a pair of hoppers having an asymmetric shape, a side wall that is positioned adjacent the side wall of the other hopper in the pair, and a metering device for allowing the powder to be conveyed to a feed zone; and a common mixing receptacle positioned beneath the hoppers for receiving powder originating from either hopper. The metering device of each hopper of the pair of hoppers is positioned near the side wall that is positioned adjacent to the other hopper, with the two hoppers positioned in relation to a longitudinal median plane of each hopper so as to form a close configuration relative to one another with the feed zones in close proximity to reduce the space requirements for the mixing receptacle.

The two hoppers in the pair are each configured to be a mirror image of the other on either side of a mirror plane that passes between the hoppers along and between the adjacent side walls. Such a configuration has the advantage of making it possible to have a compact apparatus that is nevertheless capable of preparing a large number of drinks from a multiple choice such as, for example, the preparation of hot drinks based on soluble coffee and/or milk.

According to another advantageous aspect of the invention, the device for dispensing drinks on request comprises a housing and at least one hopper in said housing that includes at least one guide member and is adapted to receive a powder refill element, and a housing located above the hopper, wherein the housing and guide member(s) are arranged to allow insertion of the refill element in a primary direction wherein the housing has a free volume capable of receiving the refill element onto the hopper whereby the refill element occupies the free volume to form an extension of the hopper storage. Preferably, the housing has a front panel and the insertion of the refill element is carried out by opening the front panel and inserting the refill element in an essentially horizontal direction. Such a supply device has the advantage of facilitating the powder supply. The supply can therefore be effected from the front of the machine simply by opening the front panel of the device. Such a system has an advantage in relation to a container-filling supply system which necessitates raising the top panel of the machine or at the very least the withdrawal of the container to carry out the refilling. The risks of dropping the powder outside the storage container are therefore reduced.

The device also may include guide means in the form of side walls that form a trough in an inverted configuration to receive and slidingly engage and guide edges of the refill element. The refill element is preferably configured in the form of a trough having a pair of edges, which refill element is inserted in an inverted position with its opening facing in the direction of the hopper, with the trough edges slidingly engaging the guide members for insertion or withdrawal of the refill element. The housing also can include a stop member for each refill element, with the stop member positioning the refill element above the feed zone for supplying the corresponding hopper with powder. In a preferred configuration, two hoppers are provided, mounted in parallel on a drawer that is slidably insertable and removable in the housing.

According to the above-mentioned characteristics, the machine can be produced in a compact manner and can therefore easily be fitted into a catering space while allowing refilling of the device with powder in a rapid manner without any particular difficulty.

The device preferably uses refill elements such as those described in U.S. patent application Ser. No. 09/497,457 filed on Feb. 3, 2000, the content of which is expressly incorporated in the present application by reference thereto.

BRIEF DESCRIPTION OF THE DRAWINGS

The remainder of the description is written with reference to the appended drawing figures, in which.

DETAILED DESCRIPTION OF THE PREFERRED EMBODIMENTS

Figure 1:
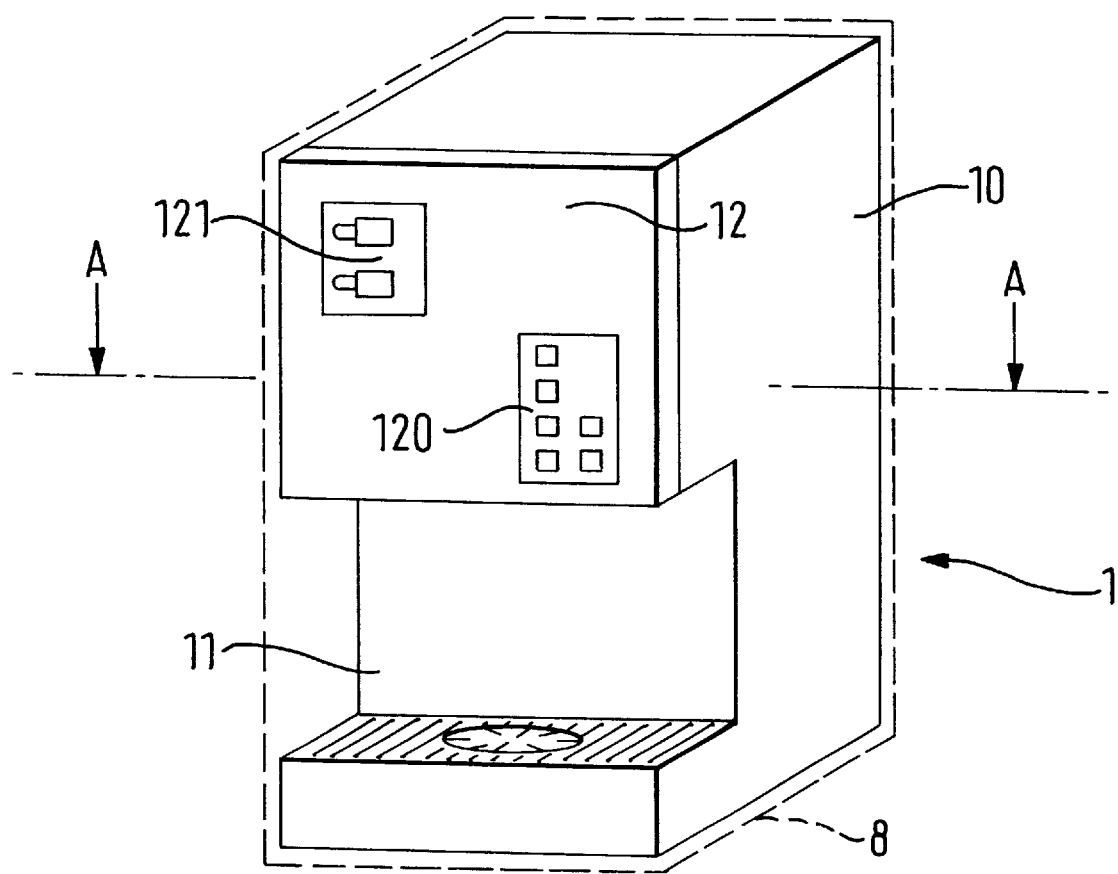
FIG. 1 is a diagrammatic illustration in perspective of a drink dispensing device according to the invention.
Figure 4:
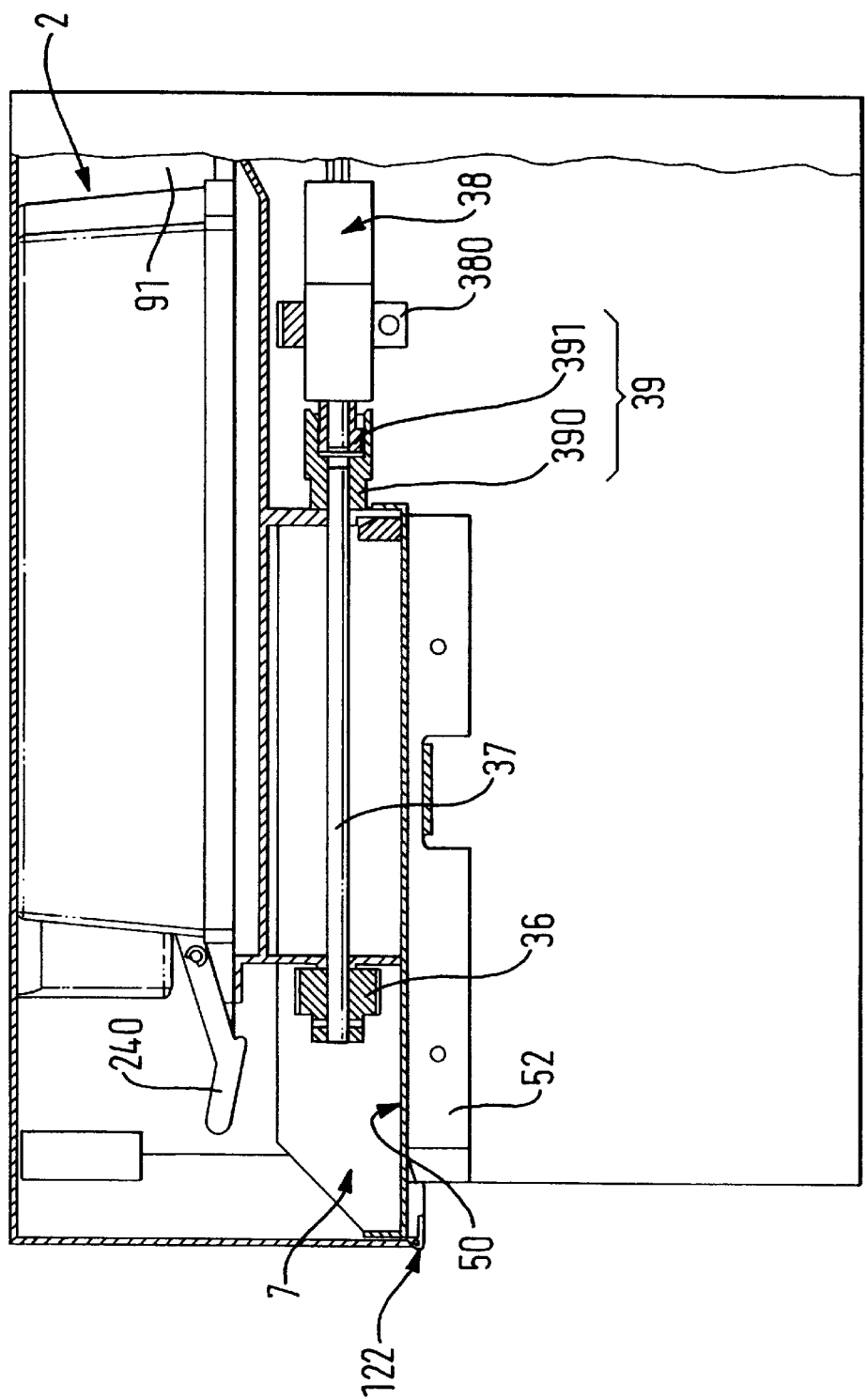
FIG. 4 shows a view in section along B—B in FIG. 3.

A dispensing device 1 according to the invention is illustrated in FIG. 1. This is a preferred example of a machine for dispensing hot drinks of the coffee type although it can be used to dispense tea, cocoa or hot chocolate as well. This device can be installed in a confined space, in particular fitted in a space 8 of standard dimensions, such as in that of an airliner catering cupboard, for example, in a self-service zone. The device comprises a cabinet 10 forming the walls of the device, which delimit an internal chamber 7, an open dispensing zone 11 for allowing the insertion of a receptacle such as a cup, a front panel 12 equipped with preselection buttons 120 and a closing system 121 secured according to the civil aviation standards in force. The panel has the characteristic of being capable of opening at the front, preferably about an axis of rotation located on one of the edges of the panel. In the present case, the panel opens by pulling downwards about an axis of rotation 122 located in the lower part of the panel (FIG. 4).

FIGS. 2 to 10 illustrate the preferred embodiment of the dispensing device comprising metering means, preferably in the form of two metering systems 20, 21 arranged in parallel in the device. A dispensing device for an airplane having two metering systems has the advantage of allowing the preparation of hot drinks on the basis of several possible combinations starting from two different types of powder, usually based on soluble coffee and/or milk powder.

Figure 5:
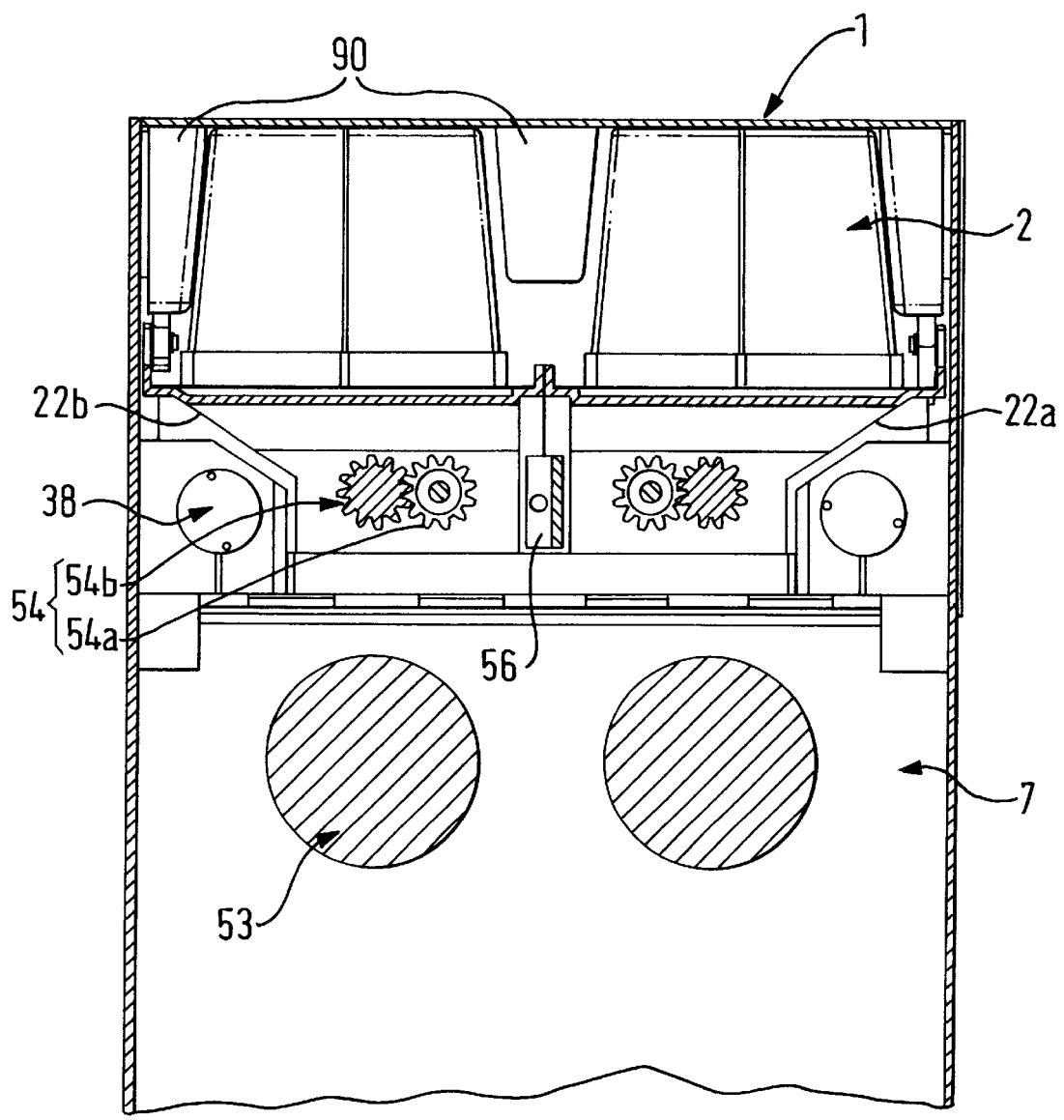
FIG. 5 shows a view in section along C—C in FIG. 3.
Figure 6:
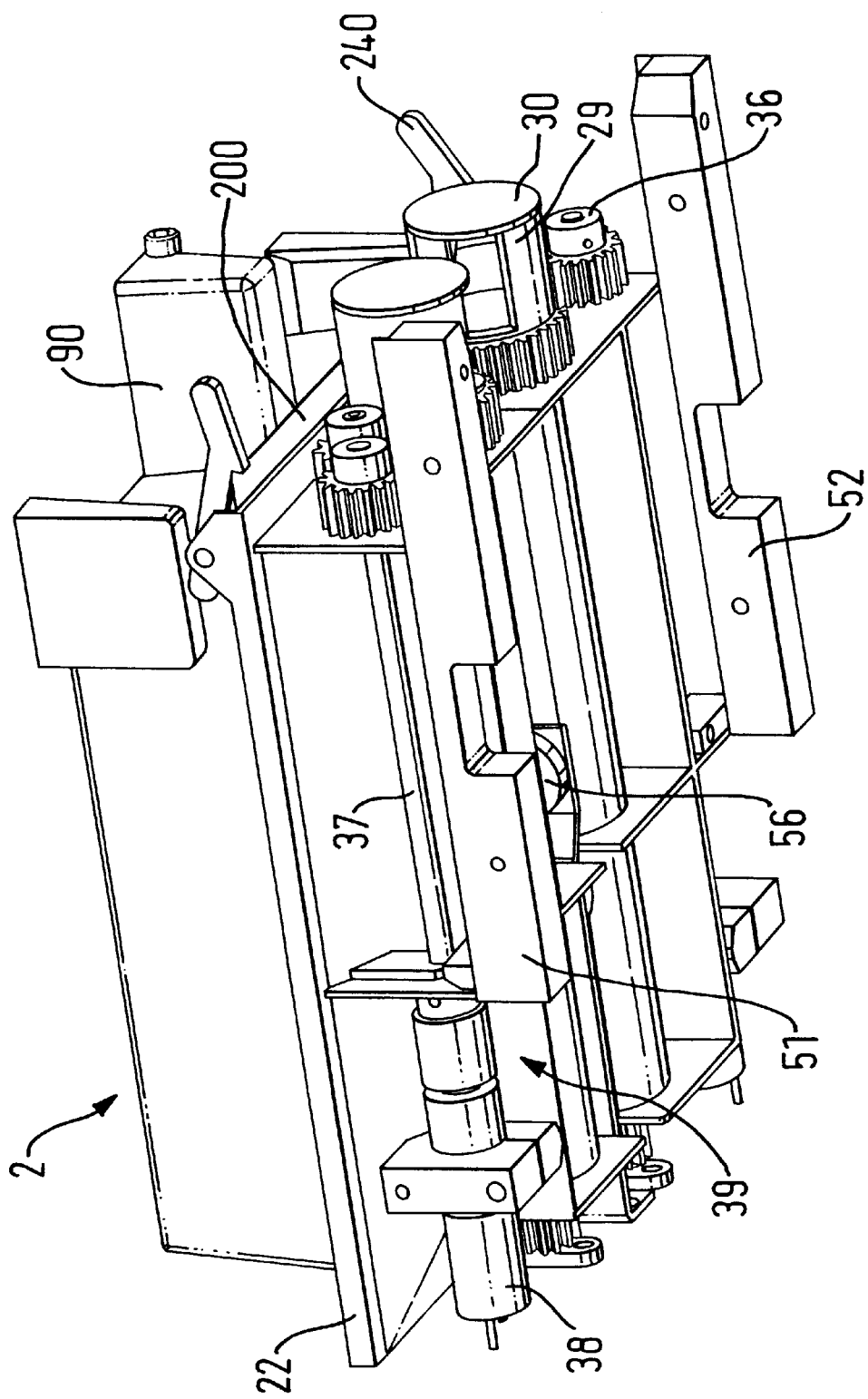
FIG. 6 shows a view in section along D—D in FIG. 3.

To render understanding easier, the description of the metering device proper is given for only one metering device, it being understood that the same elements and characteristics are found in the same general arrangement in the other device. Each device therefore comprises a hopper 22 of essentially rectangular horizontal shape which has a metering device 23 oriented longitudinally and located in the bottom of the hopper. The metering device 23 is preferably an endless metering screw, which is generally known in the art, which is driven by a drive mechanism, preferably an electric motor 53 located at the rear of the hopper (as shown in FIG. 5).

Figure 3:
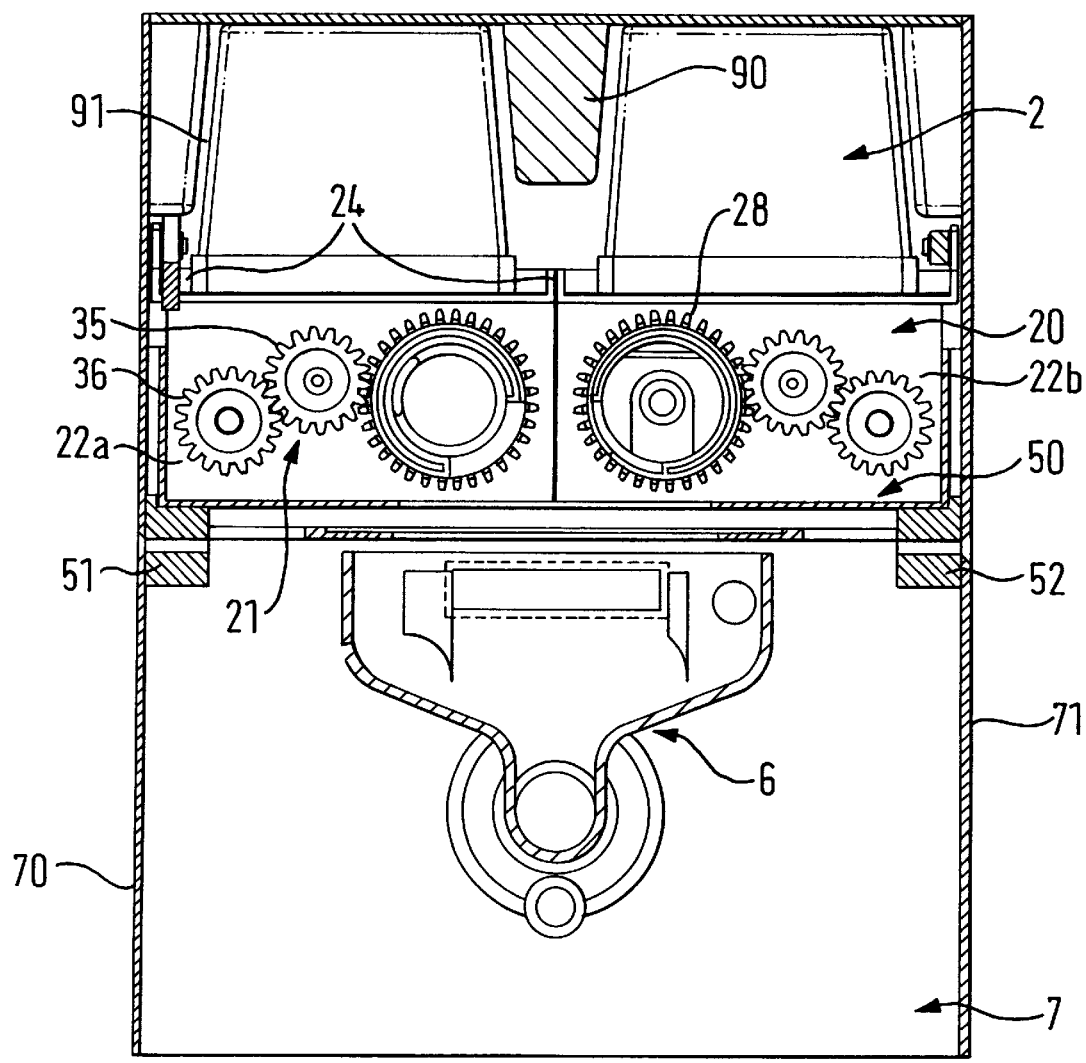
FIG. 3 shows a view in section along A—A in FIG. 1.

As FIG. 3 shows, the hopper is supplied with powder by means of a powder refill element 2 in the form of a trough having its opening facing in the direction of the hopper and edges 200 extending around the periphery of its opening, as is moreover described in greater detail in U.S. patent application Ser. No. 09/497,457.

The refill element 2 can be inserted in a main sliding direction, preferably in an essentially horizontal direction after opening the front panel 12, between filling elements 90 that form a housing 91 of the device. The horizontal direction is essentially perpendicular to the front panel of the housing. The hopper has guide means 24 and stop means 241 intended to interact with the edges 200 of the refill element and allowing the refill element 2 to be brought into an inverted position above the hopper in order to pour its contents into the latter at least in part and to serve as a storage container. The guide means include any protruding member that can interact with the edges of the refill element. In particular, a wall member 24 is illustrated to engage the refill edges, which are also wall members, but other arrangements can be used. For example, the edges of the refill element can be configured in the form or a slot, and the guide means can be one or more rod or pin members that slide in the slot. Of course, this arrangement can be reversed, with the guide means being a slot in which the edges of the refill element, in the form of a wall, pin or rod member, slide to allow withdrawal or insertion of the refill element.

Such an insertion configuration in the device has the advantage of allowing restocking of the device from the front, that is to say by opening the front panel 12, and, at the same time, optimization of the storage space in the machine with a minimum of dead volume. The size of the chamber 7 can therefore be dimensioned optimally according to the desired capacity and according to the fitting standards to be observed. The refill elements are intended to be held in place above the hoppers by stop means 240, which is generally in the form or an arm or other elongated member which engages the refill element after it is pushed into the correct position in the housing. Advantageously, the stop means 240 is in the form of a lever having an engagement part intended to interact with the front edge of the refill element. The lever is mounted on one of the guide parts 24 of the hopper. Alternatively, the stop means can be provided as a wall or abutment which prevents further insertion movement by the refill element.

The powder stored in the hopper is conveyed by the metering screw 23 to a feed zone 25 located at the front and in the continuation of the metering device.

Figure 2:
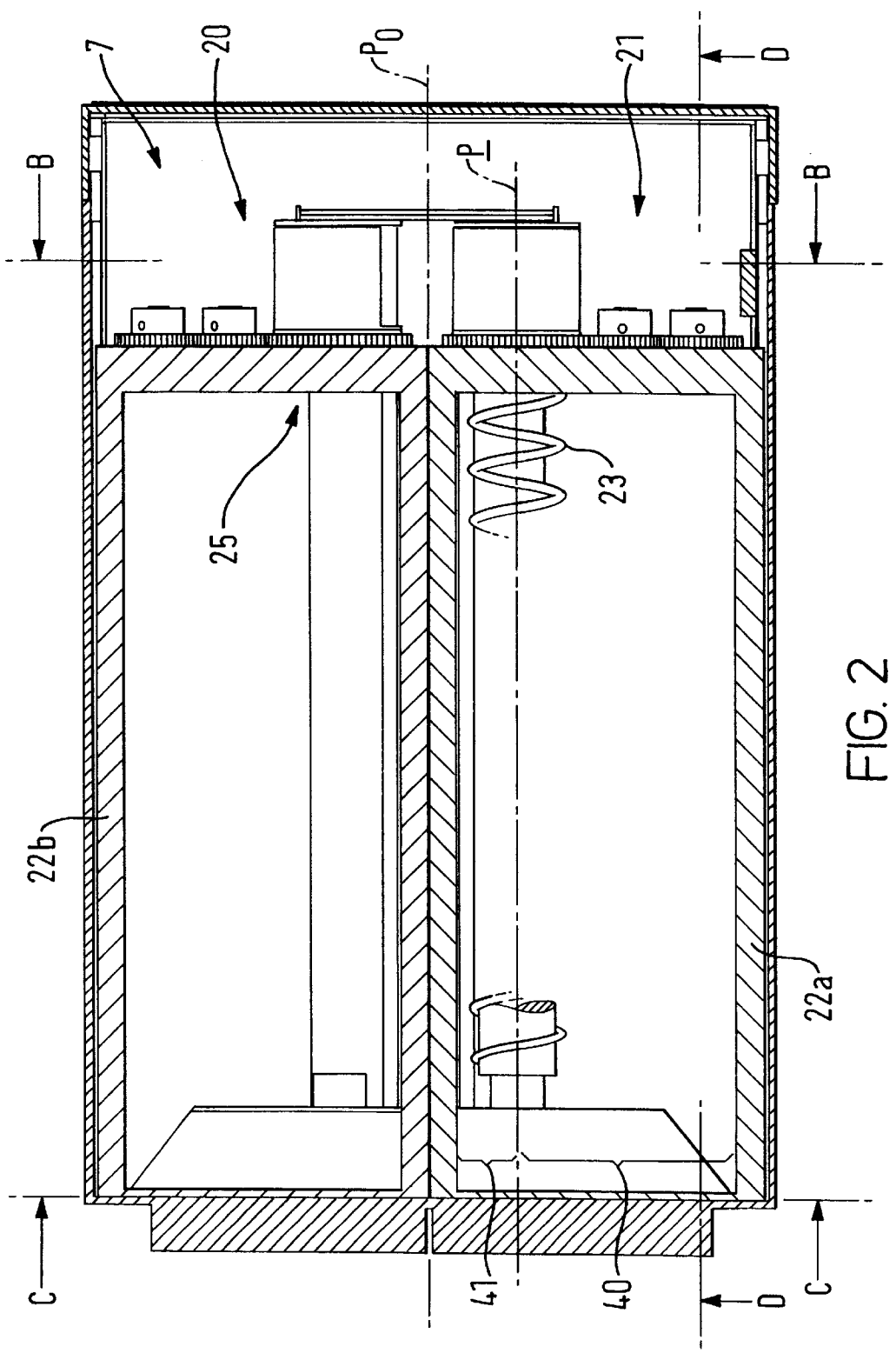
FIG. 2 illustrates in perspective a part of the device in FIG. 1.

According to an advantageous embodiment of the invention, as shown in FIG. 2, each hopper has an asymmetric longitudinal shape in relation to its longitudinal median plane P. More specifically, the hopper comprises converging walls in order to direct the mass of powder along the metering device along the feed line. The walls include an external wall having a gentle gradient 40 and an internal wall 41 having a steeper gradient. The walls meet below the metering screw along a rounded joining line following the profile of the screw. The two hoppers 22a, 22b are arranged in the dispensing device in a symmetrical manner in relation to the median axis Po of the device. The result of such a configuration is that the feed zones of the hoppers are close to one another in the vicinity of the median axis Po. The closeness of the feed zones allows the use of only one mixing bowl 6 dimensioned in an appropriate manner for receiving the powder from the two metering devices, as FIG. 3 shows. It is important to note that the closeness of the feed zones allows smaller dimensioning of the bowl 6 in all its dimensions, because, on account of its smaller width due to the closeness of the zones, the gradient necessary for satisfactory flow of the powder/liquid mixture into the mixing bowl remains sufficient to allow a relatively small height of the bowl. It is also to be noted that the closeness of the feed zones to one another brought about by the asymmetry of the hoppers makes it possible to avoid the use of converging channels known as chutes at the exit from the hoppers, which are oriented in the direction of the bowl. This is an advantage because such chutes tend to foul easily.

Figure 7:
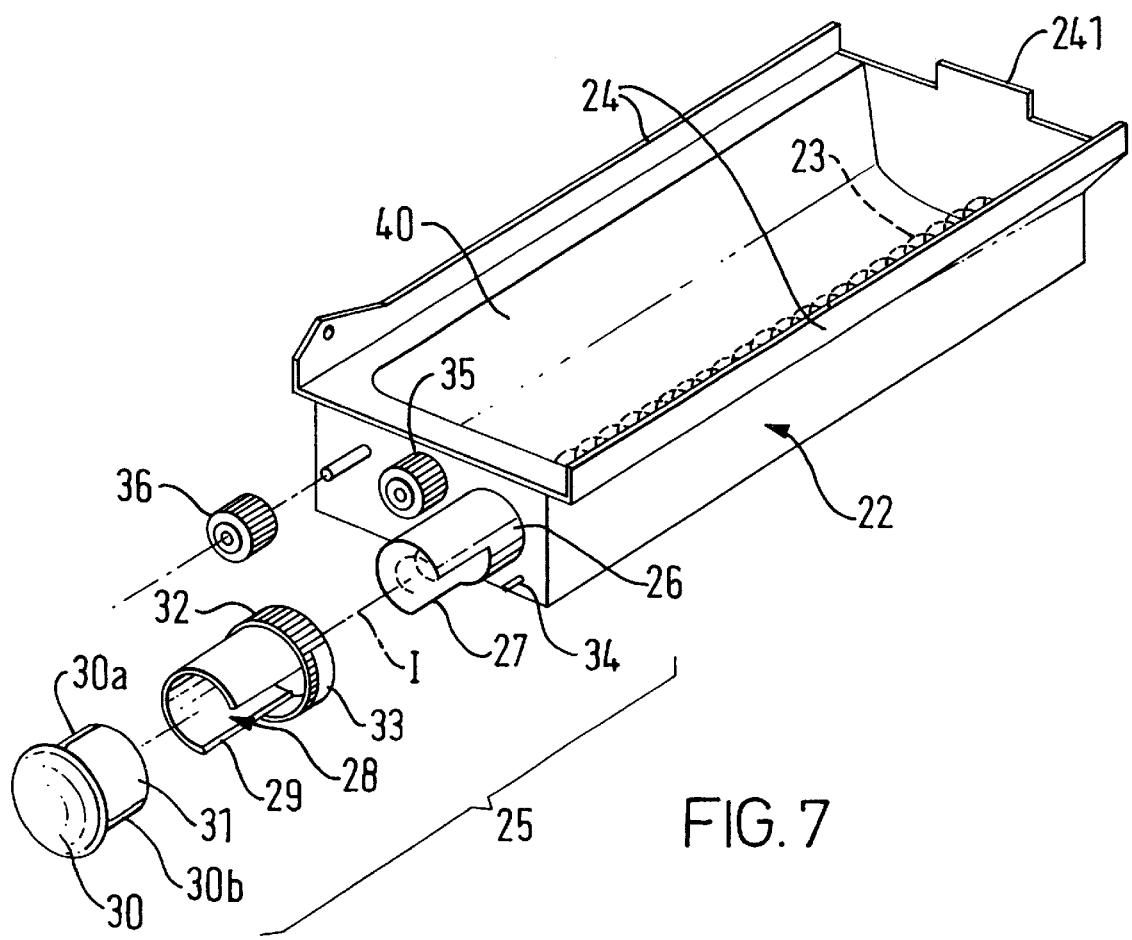
FIG. 7 shows a metering device according to the invention.

The feed zone 25 is formed by a basic portion 26 projecting outside the hopper, as FIG. 7 shows more specifically. The basic portion 26 has a tubular shape and has an opening 27 in the form of an arcuate quadrilateral portion which interrupts the tubular portion on the periphery. The opening is preferably oriented downwards in order to allow the powder to fall in the direction of the mixing bowl 6 (FIG. 3). It is also possible to have the opening facing upwards, with the powder falling by overflowing. According to a characteristic of the invention, a sealing element 28 is arranged around the basic portion 26 in order to allow selective sealing of opening 27.

The sealing element is preferably a tube or at least a portion of a tube of greater diameter and is arranged in a coaxial manner with the basic portion. The sealing element 28 has an opening or slot 29 extending over an arcuate portion in relation to the portion of tube. The slot 29 preferably has an essentially identical shape to that of the opening 27 and dimensions which are essentially identical or slightly greater to favor shearing in order to eliminate, at the end of each cycle, the burr-like encrustations which may have formed along the edges of the opening. A fixed cap 30 for closing the front of the feed zone is provided, which fits into the bore of the basic portion 26 and is prevented from rotating by appreciably projecting lips 30a, 30b delimiting the edges of an opening 31 of essentially the same design as the opening 27 with which it coincides in a fixed manner. The cap/sealing element assembly is mounted coaxially in a sliding manner along the axis I and can easily be demounted to allow thorough cleaning of the feed zone.

The sealing element 28 is operated by gear means, preferably in the form of a gear train comprising intermeshing gears 32, 35, 36 connected to a transmission rod 37 which is in turn connected to an operating mechanism 38. More specifically, the sealing element 28 has, at its base, a cylindrical gear portion 32 interrupted by an arcuate guide zone 33 for guiding a stop element 34 integral with the front of the hopper. The gear portion 32 is connected to a gear pair 35, 36 offset axially in relation to the feed axis and integral with the hopper, making it possible to offset the operation of the movement of the sealing element towards the outer side of the hopper corresponding to the side with the more gentle gradient of the hopper and therefore with greater clearance for accommodating a transmission rod 37. The transmission rod 37 is thus located below the external wall 40 of the hopper and is connected to the gear 36 located in the continuation of the rod and offset laterally in relation to an intermediate gear 35. The person skilled in the art will of course be able to determine the number and the dimensions of the gears according to the desired offset and gear reduction ratio. Advantageously, the operating mechanism 38 is an electric motor, preferably a miniature DC motor of the kind produced by the company Maxon Motor AG, model 16 EBCLL 2W SL 1WE, voltage 1 to 24 VDC.

Figure 8:
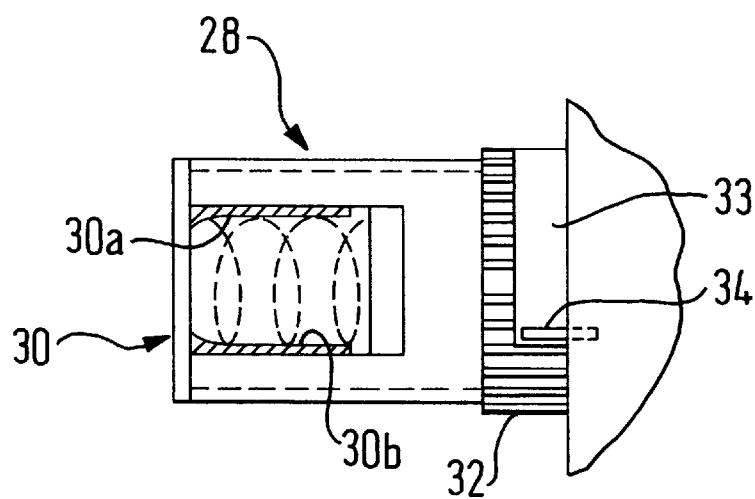
FIGS. 8–10 show the opening/closing principle of the metering device according to the invention.
Figure 9:
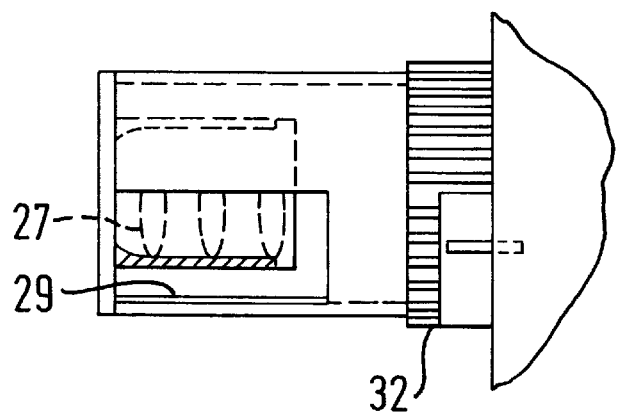
Figure 10:
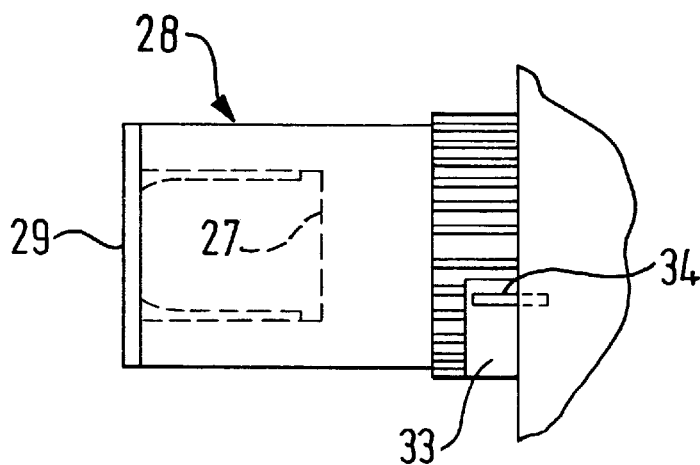

The opening/closing principle of the sealing element of the metering device is illustrated in FIGS. 8 to 10. Between two metering cycles, the sealing element 28 is in the closed position as shown in FIG. 10. A part of the portion of tube of the sealing element completely covers the slot 27 of the subjacent basic portion. In a normal metering cycle, when the consumer selects one of the selection buttons 120, the electric signal is sent to a control system (not shown) which triggers, to begin with, the opening of the sealing element 28 by actuating the operating mechanism or motor 38 bringing about the opening of the sealing element. A control system clock makes it possible to regulate the actuation time of the operating means until the end of opening.

FIG. 9 shows an intermediate open position of the sealing element. Opening regulation is effected in a precise manner by means of the stop element 34 which interacts until abutment takes place against one end of the guide zone 33 defined as the open position in FIG. 8. This position is reached when the slot 29 of the sealing element essentially coincides with the opening 27 of the basic portion. The motor is then deactuated. The control system then actuates the motor 53 of the metering device, by means of the clock, for the time necessary according to the quantity of powder to be metered by the metering screw. In the metering configuration, the feed zone is open as shown in FIG. 8. When the end of the time necessary for metering is reached, the control system deactuates the metering screw by shutting off motor 53. At this moment, the control system again actuates the motor 38, the polarity of which is reversed, which causes the rotation of the sealing element in the opposite direction. The stop element 34 regulates the closed position, serving as a limit of travel stop against the opposite end of the guide zone 33. In the closed position, the metering device is ready for a new cycle with the sealing element in a closed or sealing position (FIG. 10).

It is advantageous if the metering devices 20, 21 are mounted in the chamber 7 in an easily removable manner in order to favor maintenance and regular cleaning of the elements which come into contact with the food products. The two hoppers 22a, 22b are thus mounted together on a removable drawer 50 in the form of a tray allowing the hoppers to lie in parallel on the main surface of the drawer. The drawer is held in place in the chamber by guide elements 51, 52 connected to each lateral wall 70, 71 of the chamber. The drawer 50 is removably mounted with relation to the chamber to hold the drawer in place without the risk of possible accidental movements.

In the context of a device mounted on a removable drawer, the motors 38 are preferably integrated with the chamber 7 and comprise connection means 39 which make it possible to plug them into the transmission means when the drawer is put in place, as FIG. 4 shows. More specifically, the plug-in connection means form a coupling sub-assembly comprising a female socket 390 integral with the transmission rod 37, with which a male plug 391 integral with the motor 38 interacts in a removable manner. The motor is moreover integrated with the lateral walls of the internal chamber 7 by connection means 380 of the screw or rivet type or equivalent.

In the same manner, the motors 53 which operate the metering devices are integrated with the chamber while the drawer includes the metering devices. As FIG. 5 shows, the connection of the motors 53 can be effected by connection members such as a gear pair 54 located at the rear of the hoppers 22a, 22b. A first gear 54a is integral with the metering means while a second gear 54b is coupled to the motor by a gear-reduction sub-assembly (not shown). When the drawer is pushed into position in the chamber 7, the gear 54a occupies a position next to the gear 54b.

FIG. 5 also shows a system for controlling the level of powder comprising sensors 56 of the capacitive-type arranged between the two hoppers 22a, 22b and connected to the control system. When the powder level becomes too low, a signal is sent by the sensor to the control system which illuminates an individual diode or a diode common to the two sensors on the front panel of the device. The operator is then warned that at least one of the refill elements requires replacement. Replacement is effected simply by opening the panel, raising the lever 240, withdrawing the empty refill element and inserting a new full refill in a horizontal sliding movement along the guide means 24 as far as the stop means 241, and then reclosing the panel.

For application on board an airliner, for example, the device according to the invention as illustrated in FIG. 1 is capable of satisfying highly regulated dimensional and electrical standards requiring the approval of certifying bodies (CAA, JAA or FAA). By way of example, the device according to the invention can comply with the following dimensions: width 6.3" (160 mm), height 12.0" (305 mm), depth 15.28" (388 mm). The power supply of the device for such an application is adapted to take a 400 Hz, three-phase, 115/200 Volt alternating current. Standard CA3106R16S-1PF80 type connectors are installed, allowing the device to be plugged into the supply system of a properly equipped cupboard. A low-voltage DC circuit (5, 12 and/or 24 Volts) for operating the motors is provided in the device by means of a specific transformer making it possible to transform the main input current into low-voltage current in the circuit. A water-heating device is also provided in the device, of the boiler type with a resistive heating body or of the thermobloc type or the like, which can operate on the basis of the main input current so that sufficient heating power is available.

Other applications could be envisaged for the device of the invention, in particular, in conditions where a compact and efficient dispensing system is needed such as in trains, motor homes, offices, catering areas, restaurants and so on.

What is claimed is:

1. A device for metering a powder-based food product comprising a hopper for storage of a food or beverage powder, a feed zone that includes a basic portion having an opening for allowing a metered quantity of powder to fall, a metering device located in the hopper for conveying powder from the hopper to the feed device, a sealing element arranged with the basic portion to provide sealing of the opening of the basic portion, and an operating mechanism for positioning the sealing element in a sealing position when the metering device is not operating.

2. The device of claim 1, wherein the sealing element is movable between the sealing position, where the powder cannot fall into the feed zone, and an inoperative position, where powder can fall freely into the feed zone, and wherein the operating mechanism is operatively associated with the sealing element to move the sealing element between the sealing and inoperative positions.

3. The device of claim 2, wherein the basic portion comprises a tube that has an opening for allowing powder to fall into the feed zone, and the sealing element is arranged coaxially in relation to the basic portion in order to allow sealing of the basic portion tube opening by rotation of the sealing element around the basic portion.

4. The device of claim 3, wherein the sealing element is in the form of a tube having open and closed portions, wherein, in the inoperative position, the opening of the sealing element is located adjacent the opening of the basic portion so that powder can fall into the feed zone.

5. The device of claim 4, wherein the sealing element and basic portion are positioned in sufficiently close proximity so as to eliminate or minimize powder encrustations and buildups adjacent the openings or the tubes.

6. The device of claim 2, which further comprises a control system which carries out the metering cycle of:
(a) actuation of the operating mechanism to move the sealing element from the sealing position to the inoperative position to an open position and deactuation of the operating mechanism when the sealing element is in the inoperative position,
(b) actuation of the metering device to start powder metering,
(c) deactuation of the metering device to stop powder metering, and
(d) reactuation of the operating means to move the sealing element from the inoperative position to the sealing position and deactuation of the operating mechanism when the sealing element is in the sealing position.

7. The device of claim 1, wherein the operating mechanism is located at the rear of the hopper, and comprises a drive mechanism for driving the sealing element and a transmission mechanism for connecting the drive mechanism to the sealing element.

8. The device of claim 7, wherein the metering device is offset to one side of the hopper in relation to a longitudinal median plane of the hopper, and that the transmission mechanism comprises a plurality of gear members for connection of the sealing element to a transmission rod that is connected to the drive mechanism.

9. A compact device for the preparation and automatic dispensing of drinks on request, comprising:
at least two hoppers for the storage of two different food or beverage-forming powders which can be selected either individually or as a mixture, with each hopper of a pair of hoppers having an asymmetric shape, a side wall that is positioned adjacent the side wall of the other hopper in the pair, and a metering device for allowing the powder to be conveyed to a feed zone; and
a common mixing receptacle positioned beneath the hoppers for receiving powder originating from either hopper;
wherein the metering device of each hopper of the pair of hoppers is positioned near the side wall that is positioned adjacent to the other hopper, with the two hoppers positioned in relation to a longitudinal median plane of each hopper so as to form a close configuration relative to one another with the feed zones in close proximity to reduce the space requirements for the mixing receptacle.

10. The device of claim 9, wherein the two hoppers in the pair are each configured to be a mirror image of the other on either side of a mirror plane that passes between the hoppers along and between the adjacent side walls.

11. The device of claim 9, which further comprises, above each hopper, a housing and guide means for the insertion of a powder refill element.

12. The device of claim 11, wherein the guide means is configured in the form of side walls that form a trough in an inverted configuration to receive and slidingly engage and guide edges of the refill element.

13. The device of claim 12, wherein the housing further comprises a stop member for each refill element, with the stop member positioning the refill element above the feed zone for supplying the corresponding hopper with powder.

14. The device of claim 9, wherein the two hoppers are mounted in parallel on a drawer which is slidably insertable and removable in the housing.

15. A device for dispensing drinks on request comprising a housing and at least one hopper in said housing that includes at least one guide member and is adapted to receive a powder refill element, and a housing located above the hopper, wherein the housing and guide member(s) are arranged to allow insertion of the refill element in a primary direction wherein the housing has a free volume capable of receiving the refill element onto the hopper whereby the refill element occupies the free volume to form an extension of the hopper storage.

16. The device of claim 15, in combination with a refill element in the form of a trough having a pair of edges, which refill element is inserted in an inverted position with its opening facing in the direction of the hopper, with the trough edges slidingly engaging the guide members for insertion or withdrawal of the refill element.

17. The device of claim 15, wherein the vertical panel is a front panel which provides access to the housing for insertion or withdrawal of refill element(s), and the device further comprises a stop member in the form of a wall for preventing forward insertion of the refill element(s) after positioning above the hopper.

18. The device of claim 15, which further comprises means for locking the powder refill element above the hopper in the housing.

19. A combination of a refill element and a device for dispensing drinks on request, the device comprising at least one hopper portion extending along a first direction, a housing located above the hopper along the first direction, and one or more guide members for guiding a powder refill element during insertion into or withdrawal from the housing above the hopper by motion along the first direction, wherein the refill element is in the form of a trough having a pair of edges, which refill element is inserted in an inverted position with its opening facing in the direction of the hopper, with the trough edges slidingly engaging the guide members during insertion or withdrawal of the refill element, and the device further comprises a stop member in the form of a wall for preventing forward insertion of the refill element after positioning above the hopper.

* * * * *